(12) United States Patent
Kielb et al.

(10) Patent No.: US 8,049,361 B2
(45) Date of Patent: *Nov. 1, 2011

(54) RF ADAPTER FOR FIELD DEVICE WITH LOOP CURRENT BYPASS

(75) Inventors: John A. Kielb, Eden Prairie, MN (US); Brian L. Westfield, Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/486,253

(22) Filed: Jun. 17, 2009

(65) Prior Publication Data

US 2009/0311971 A1    Dec. 17, 2009

Related U.S. Application Data

(60) Provisional application No. 61/073,093, filed on Jun. 17, 2008.

(51) Int. Cl.
*H02J 3/00*    (2006.01)
(52) U.S. Cl. .......................................................... 307/36
(58) Field of Classification Search .................. 307/36
See application file for complete search history.

(56) References Cited

U.S. PATENT DOCUMENTS

| | | | |
|---|---|---|---|
| 2,533,339 A | 12/1950 | Willenborg | 177/311 |
| 2,883,489 A | 4/1959 | Eadie, Jr. et al. | 335/148 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,612,851 A | 10/1971 | Fowler | 362/30 |
| 3,697,835 A | 10/1972 | Satori | 317/246 |
| D225,743 S | 1/1973 | Seltzer | D10/102 |
| 3,742,450 A | 6/1973 | Weller | 375/257 |
| 3,808,480 A | 4/1974 | Johnston | 317/256 |
| 3,924,219 A | 12/1975 | Braun | 338/34 |

(Continued)

FOREIGN PATENT DOCUMENTS

CH    672 368 A5    11/1989

(Continued)

OTHER PUBLICATIONS

U.S. Appl. No. 12/485,169, filed Jun. 16, 2009.

(Continued)

*Primary Examiner* — Robert L. Deberadinis
(74) *Attorney, Agent, or Firm* — Westman, Champlin & Kelly, P.A.

(57) ABSTRACT

A wireless adapter for use with a two-wire process control loop is configured to couple to a process field device in an industrial process control system. The wireless adapter is coupled to the two-wire process control loop and provides wireless communication to the process field device. The adapter includes first and second loop terminals configured to couple in series with the two-wire process control loop. Wireless communication circuitry is coupled to the first and second loop terminals and is adapted to provide wireless communication to the process field device. Loop current bypass circuitry is electrically connected between the first and second loop terminals and is configured to provide a loop current path therebetween in response to an open circuit in wireless communication circuitry.

22 Claims, 8 Drawing Sheets

U.S. PATENT DOCUMENTS

| | | | |
|---|---|---|---|
| 4,008,619 A | 2/1977 | Alcaide et al. | 73/398 |
| 4,063,349 A | 12/1977 | Passler et al. | 29/627 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,383,801 A | 5/1983 | Pryor | 416/17 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,475,047 A | 10/1984 | Ebert | 307/66 |
| 4,476,853 A | 10/1984 | Arbogast | 126/578 |
| 4,490,773 A | 12/1984 | Moffatt | 361/283 |
| 4,510,400 A | 4/1985 | Kiteley | 307/66 |
| 4,542,436 A | 9/1985 | Carusillo | 361/283 |
| 4,562,742 A | 1/1986 | Bell | 73/718 |
| 4,570,217 A | 2/1986 | Allen et al. | 700/83 |
| 4,590,466 A | 5/1986 | Wiklund et al. | 340/870.28 |
| 4,670,733 A | 6/1987 | Bell | 338/36 |
| 4,701,938 A | 10/1987 | Bell | 375/257 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A | 1/1991 | Gross | 377/6 |
| 5,009,311 A | 4/1991 | Schenk | 206/332 |
| 5,014,176 A | 5/1991 | Kelleher et al. | 363/26 |
| 5,023,746 A | 6/1991 | Epstein | 361/56 |
| 5,025,202 A | 6/1991 | Ishii et al. | 220/101 |
| 5,045,963 A | 9/1991 | Hansen et al. | 361/87 |
| 5,060,295 A | 10/1991 | Borras et al. | 455/186 |
| 5,094,109 A | 3/1992 | Dean et al. | 73/718 |
| D331,370 S | 12/1992 | Williams | D10/46 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| D345,107 S | 3/1994 | Williams | D10/46 |
| 5,329,818 A | 7/1994 | Frick et al. | 73/708 |
| 5,492,016 A | 2/1996 | Pinto et al. | 73/724 |
| 5,495,769 A | 3/1996 | Broden et al. | 73/18 |
| 5,506,757 A | 4/1996 | Brorby | 361/796 |
| 5,542,300 A | 8/1996 | Lee | 73/724 |
| 5,546,804 A | 8/1996 | Johnson et al. | 73/431 |
| 5,554,809 A | 9/1996 | Tobita et al. | 73/700 |
| 5,606,513 A | 2/1997 | Louwagie et al. | 702/138 |
| 5,610,552 A | 3/1997 | Schlesinger et al. | 327/560 |
| 5,637,802 A | 6/1997 | Frick et al. | 73/724 |
| 5,642,301 A | 6/1997 | Warrior et al. | 364/571.02 |
| 5,656,782 A | 8/1997 | Powell, II et al. | 73/756 |
| 5,665,899 A | 9/1997 | Willcox | 73/1.63 |
| 5,672,832 A | 9/1997 | Cucci et al. | 73/861.52 |
| 5,682,476 A | 10/1997 | Tapperson et al. | 395/200.05 |
| 5,705,978 A | 1/1998 | Frick et al. | 340/511 |
| 5,710,552 A | 1/1998 | McCoy et al. | 340/870.21 |
| 5,757,608 A | 5/1998 | Bernot et al. | 361/283.4 |
| 5,787,120 A | 7/1998 | Louagie et al. | 375/257 |
| 5,793,963 A | 8/1998 | Tapperson et al. | 395/200.31 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,954,526 A | 9/1999 | Smith | 439/136 |
| 5,978,658 A | 11/1999 | Shoji | 455/66 |
| 5,992,240 A | 11/1999 | Tsuruoka et al. | 73/718 |
| 6,038,927 A | 3/2000 | Karas | 73/706 |
| 6,062,095 A | 5/2000 | Mulrooney et al. | 73/866.5 |
| 6,079,276 A | 6/2000 | Frick et al. | 73/18 |
| 6,127,739 A | 10/2000 | Appa | 290/55 |
| 6,150,798 A | 11/2000 | Ferry et al. | 323/273 |
| D439,177 S | 3/2001 | Fandrey et al. | D10/46 |
| D439,178 S | 3/2001 | Fandrey et al. | D10/46 |
| D439,179 S | 3/2001 | Fandrey et al. | D10/46 |
| D439,180 S | 3/2001 | Fandrey et al. | D10/85 |
| D439,181 S | 3/2001 | Fandrey et al. | D10/46 |
| D441,672 S | 5/2001 | Fandrey et al. | D10/52 |
| 6,236,096 B1 | 5/2001 | Chang et al. | 257/419 |
| 6,236,334 B1 | 5/2001 | Tapperson et al. | 340/825 |
| 6,282,247 B1 | 8/2001 | Shen | 375/285 |
| 6,295,875 B1 | 10/2001 | Frick et al. | 73/718 |
| 6,338,283 B1 | 1/2002 | Blazquez Navarro | 73/865.8 |
| 6,360,277 B1 | 3/2002 | Ruckley et al. | 709/250 |
| 6,366,436 B1 | 4/2002 | Maier et al. | 361/93.9 |
| 6,385,972 B1 | 5/2002 | Fellows | 60/517 |
| 6,405,139 B1 | 6/2002 | Kicinski et al. | 702/33 |
| 6,429,786 B1 | 8/2002 | Bansemir et al. | 340/870.27 |
| 6,441,747 B1 | 8/2002 | Khair et al. | 340/870.16 |
| 6,457,367 B1 | 10/2002 | Behm et al. | 73/753 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,508,131 B2 | 1/2003 | Frick | 73/756 |
| 6,510,740 B1 | 1/2003 | Behm et al. | 73/708 |
| 6,511,337 B1 | 1/2003 | Fandrey et al. | 439/320 |
| D471,829 S | 3/2003 | Dennis et al. | D10/85 |
| D472,831 S | 4/2003 | Dennis et al. | D10/85 |
| 6,546,805 B2 | 4/2003 | Fandrey et al. | 73/753 |
| 6,553,076 B1 | 4/2003 | Huang | 375/257 |
| 6,568,279 B2 | 5/2003 | Behm et al. | 73/753 |
| 6,571,132 B1 | 5/2003 | Davis et al. | 700/2 |
| 6,574,515 B1 | 6/2003 | Kirkpatrick et al. | 700/19 |
| 6,593,857 B1 | 7/2003 | Roper et al. | 340/870.3 |
| 6,609,427 B1 | 8/2003 | Westfield et al. | 73/753 |
| 6,662,662 B1 | 12/2003 | Nord et al. | 73/715 |
| 6,680,690 B1 | 1/2004 | Nilsson et al. | 342/124 |
| 6,711,446 B2 | 3/2004 | Kirkpatrick et al. | 700/19 |
| 6,747,573 B1 | 6/2004 | Gerlach et al. | 340/870.21 |
| 6,765,968 B1 | 7/2004 | Nelson et al. | 375/257 |
| 6,771,560 B2 | 8/2004 | Lyon et al. | 367/13 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,823,072 B1 | 11/2004 | Hoover | 381/7 |
| 6,839,546 B2 | 1/2005 | Hedtke | 455/67.11 |
| 6,839,790 B2 | 1/2005 | Barros De Almeida et al. | 710/305 |
| 6,891,838 B1 | 5/2005 | Petite et al. | 370/401 |
| 6,898,980 B2 | 5/2005 | Behm et al. | 73/756 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,961,665 B2 | 11/2005 | Slezak | 702/61 |
| 0,289,276 A1 | 12/2005 | Karschnia et al. | 710/305 |
| 6,995,685 B2 | 2/2006 | Randall | 340/870.39 |
| 7,010,294 B1 | 3/2006 | Pyotsia et al. | 455/420 |
| 7,058,542 B2 | 6/2006 | Hauhia et al. | 702/183 |
| 7,088,285 B2 | 8/2006 | Smith | 342/124 |
| 7,109,883 B2 | 9/2006 | Trimble et al. | 340/870.16 |
| 7,233,745 B2 | 6/2007 | Loechner | 398/128 |
| 7,262,693 B2 * | 8/2007 | Karschnia et al. | 340/508 |
| 7,271,679 B2 | 9/2007 | Lundberg et al. | 333/24 |
| 7,301,454 B2 | 11/2007 | Seyfang et al. | 340/539.26 |
| 7,329,959 B2 | 2/2008 | Kim et al. | 290/2 |
| 7,560,907 B2 * | 7/2009 | Nelson | 322/37 |
| 2001/0025349 A1 | 9/2001 | Sharood et al. | 713/340 |
| 2002/0011115 A1 | 1/2002 | Frick | 73/718 |
| 2002/0029130 A1 | 3/2002 | Eryurek et al. | 702/183 |
| 2002/0065631 A1 | 5/2002 | Loechner | 702/188 |
| 2002/0082799 A1 | 6/2002 | Pramanik | 702/130 |
| 2002/0095520 A1 | 7/2002 | Wettstein et al. | 709/253 |
| 2002/0097031 A1 | 7/2002 | Cook et al. | 323/273 |
| 2002/0105968 A1 | 8/2002 | Pruzan et al. | 370/465 |
| 2002/0163323 A1 | 11/2002 | Kasai et al. | 323/284 |

| | | | |
|---|---|---|---|
| 2003/0043052 A1 | 3/2003 | Tapperson et al. ........ 340/825.37 |
| 2003/0079553 A1 | 5/2003 | Cain et al. ................. 73/861.27 |
| 2003/0083038 A1 | 5/2003 | Poon et al. ..................... 455/344 |
| 2003/0143958 A1 | 7/2003 | Elias et al. ....................... 455/73 |
| 2003/0171827 A1 | 9/2003 | Keyes et al. ..................... 700/19 |
| 2003/0204371 A1 | 10/2003 | Sciamanna ................... 702/183 |
| 2004/0086021 A1 | 5/2004 | Litwin ........................... 374/120 |
| 2004/0124854 A1 | 7/2004 | Slezak ........................... 324/644 |
| 2004/0142733 A1 | 7/2004 | Parise ............................ 455/572 |
| 2004/0183550 A1 | 9/2004 | Fehrenbach et al. .............. 27/26 |
| 2004/0184517 A1 | 9/2004 | Westfield et al. .............. 375/219 |
| 2004/0199681 A1 | 10/2004 | Hedtke ............................ 710/37 |
| 2004/0203434 A1 | 10/2004 | Karschnia et al. .......... 455/67.11 |
| 2004/0211456 A1 | 10/2004 | Brown et al. .................. 136/243 |
| 2004/0214543 A1 | 10/2004 | Osone et al. ................ 455/179.2 |
| 2004/0218326 A1 | 11/2004 | Duren et al. .................. 361/93.1 |
| 2004/0242169 A1 | 12/2004 | Albsmeier et al. .............. 455/91 |
| 2004/0259533 A1 | 12/2004 | Nixon et al. ................. 455/414.1 |
| 2005/0017602 A1 | 1/2005 | Arms et al. .................... 310/339 |
| 2005/0023858 A1 | 2/2005 | Bingle et al. ..................... 296/76 |
| 2005/0029236 A1 | 2/2005 | Gambino et al. ........ 219/121.69 |
| 2005/0040570 A1 | 2/2005 | Asselborn ........................ 266/99 |
| 2005/0046595 A1 | 3/2005 | Blyth ............................. 340/908 |
| 2005/0056106 A1 | 3/2005 | Nelson et al. ................. 73/866.3 |
| 2005/0072239 A1 | 4/2005 | Longsdorf et al. .............. 73/649 |
| 2005/0109395 A1 | 5/2005 | Seberger ........................... 137/8 |
| 2005/0115601 A1 | 6/2005 | Olsen et al. ................... 136/212 |
| 2005/0118468 A1 | 6/2005 | Adams et al. ................... 429/22 |
| 2005/0130605 A1 | 6/2005 | Karschnia et al. ............ 455/90.3 |
| 2005/0164684 A1 | 7/2005 | Chen et al. .................. 455/414.1 |
| 2005/0201349 A1 | 9/2005 | Budampati .................... 370/342 |
| 2005/0222698 A1 | 10/2005 | Eryurek et al. ................. 700/90 |
| 2005/0228509 A1 | 10/2005 | James .............................. 700/19 |
| 2005/0245291 A1 | 11/2005 | Brown et al. .................. 455/572 |
| 2005/0276233 A1 | 12/2005 | Shepard et al. ................ 370/254 |
| 2005/0281215 A1 | 12/2005 | Budampati et al. ........... 370/328 |
| 2005/0289276 A1 | 12/2005 | Karschnia et al. ............ 710/305 |
| 2006/0002368 A1 | 1/2006 | Budampati et al. ........... 370/351 |
| 2006/0028431 A1 | 2/2006 | Amis ............................. 340/431 |
| 2006/0036404 A1 | 2/2006 | Wiklund et al. ............... 702/183 |
| 2006/0063522 A1 | 3/2006 | McFarland .................... 455/423 |
| 2006/0092039 A1 | 5/2006 | Saito et al. ............... 340/825.37 |
| 2006/0131428 A1 | 6/2006 | Wang et al. ................... 235/492 |
| 2006/0148410 A1 | 7/2006 | Nelson et al. ............... 455/67.11 |
| 2006/0181406 A1 | 8/2006 | Petite et al. ................... 340/521 |
| 2006/0194547 A1 | 8/2006 | Davis ............................... 455/69 |
| 2006/0227729 A1 | 10/2006 | Budampati et al. ........... 370/278 |
| 2006/0274644 A1 | 12/2006 | Budampati et al. ........... 370/216 |
| 2006/0274671 A1 | 12/2006 | Budampati et al. ........... 370/254 |
| 2006/0287001 A1 | 12/2006 | Budampati et al. ........ 455/552.1 |
| 2006/0290328 A1 | 12/2006 | Orth .............................. 323/218 |
| 2007/0030816 A1 | 2/2007 | Kolavennu .................... 370/252 |
| 2007/0030832 A1 | 2/2007 | Gonia et al. ................... 370/328 |
| 2007/0054630 A1 | 3/2007 | Scheible et al. ............. 455/90.3 |
| 2007/0055463 A1 | 3/2007 | Florenz et al. .................. 702/50 |
| 2007/0229255 A1 | 10/2007 | Loechner ...................... 340/540 |
| 2007/0233283 A1 | 10/2007 | Chen .............................. 700/17 |
| 2007/0237137 A1 | 10/2007 | McLaughlin .................. 370/389 |
| 2007/0275755 A1 | 11/2007 | Chae et al. .................... 455/557 |
| 2007/0279009 A1 | 12/2007 | Kobayashi .................... 710/305 |
| 2007/0280144 A1 | 12/2007 | Hodson et al. ................ 370/312 |
| 2007/0280178 A1 | 12/2007 | Hodson et al. ................ 370/338 |
| 2007/0280286 A1 | 12/2007 | Hodson et al. ................ 370/466 |
| 2007/0280287 A1 | 12/2007 | Samundrala et al. ......... 370/466 |
| 2007/0282463 A1 | 12/2007 | Hodson et al. .................. 700/20 |
| 2007/0285224 A1 | 12/2007 | Karschnia et al. ............ 340/538 |
| 2007/0288204 A1 | 12/2007 | Gienke et al. ................. 702/188 |
| 2008/0010600 A1 | 1/2008 | Katano ......................... 715/748 |
| 2008/0280568 A1* | 11/2008 | Kielb et al. ................... 455/74.1 |
| 2008/0310195 A1 | 12/2008 | Seberger et al. ................ 363/26 |
| 2009/0015216 A1 | 1/2009 | Seberger et al. .............. 323/234 |
| 2009/0081957 A1 | 3/2009 | Sinreich .......................... 455/68 |
| 2009/0146502 A1 | 6/2009 | Sinreich ........................ 307/104 |
| 2009/0253388 A1 | 10/2009 | Kielb et al. ................... 455/117 |
| 2009/0309558 A1 | 12/2009 | Kielb ............................ 323/234 |
| 2009/0311971 A1 | 12/2009 | Kielb et al. ................... 455/74.1 |
| 2009/0311975 A1 | 12/2009 | Vanderaa et al. ............. 455/90.3 |
| 2009/0311976 A1 | 12/2009 | Vanderaa et al. ............. 455/90.3 |
| 2010/0000316 A1 | 1/2010 | Fehrenbach et al. ............. 73/295 |

FOREIGN PATENT DOCUMENTS

| | | |
|---|---|---|
| CN | 06 199284 A | 7/1994 |
| CN | 1 429 354 A | 7/2003 |
| CN | 1 442 822 A | 9/2003 |
| CN | 100386602 C | 5/2008 |
| DE | 2710211 | 9/1978 |
| DE | 3340834 A1 | 5/1985 |
| DE | 37 11 754 A1 | 10/1988 |
| DE | 38 42 379 A1 | 6/1990 |
| DE | 196 22 295 | 5/1996 |
| DE | 201 07 112 U1 | 7/2001 |
| DE | 101 04 582 A1 | 10/2001 |
| DE | 100 41 160 | 3/2002 |
| DE | 102 21 931 A1 | 5/2002 |
| DE | 10 2004 020 393 | 11/2005 |
| EP | 0 518 916 B1 | 2/1991 |
| EP | 0 524 550 A1 | 1/1993 |
| EP | 0 895 209 A1 | 2/1999 |
| EP | 0 945 714 | 9/1999 |
| EP | 1 202 145 A1 | 5/2002 |
| EP | 1 192 614 | 1/2003 |
| EP | 1 293 853 A1 | 3/2003 |
| EP | 1 879 294 | 1/2008 |
| FI | 118699 B | 2/2008 |
| GB | 1 397 435 A | 6/1975 |
| GB | 2 300 265 A | 10/1996 |
| GB | 2 403 043 | 6/2004 |
| JP | 02067794 | 7/1990 |
| JP | 2000-304148 | 11/2000 |
| JP | 2003-070079 | 11/2000 |
| JP | 2003/042881 | 2/2003 |
| JP | 2003051894 | 2/2003 |
| JP | 2003134261 | 5/2003 |
| JP | 2004021877 | 1/2004 |
| JP | 2004-146254 | 5/2004 |
| JP | 2004-317593 | 11/2004 |
| JP | 2005-207648 | 8/2005 |
| RU | 2 131 934 C1 | 6/1999 |
| RU | 2342639 C2 | 8/2003 |
| WO | WO 91/13417 | 9/1991 |
| WO | WO 95/07522 | 3/1995 |
| WO | WO 96/12993 | 5/1996 |
| WO | WO 99/53286 | 10/1999 |
| WO | WO 01/48723 | 7/2001 |
| WO | WO 01/76148 | 10/2001 |
| WO | WO 02/05241 | 1/2002 |
| WO | WO 03/023536 | 3/2003 |
| WO | WO 03/089881 | 10/2003 |
| WO | WO 2004/023423 | 3/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2007/002769 | 1/2007 |
| WO | WO 2009/003146 | 12/2008 |
| WO | WO 2009/003148 | 12/2008 |
| WO | WO 2009/063056 | 5/2009 |

OTHER PUBLICATIONS

U.S. Appl. No. 12/485,189, filed Jun. 16, 2009.
U.S. Appl. No. 12/486,282, filed Jun. 17, 2009.
U.S. Appl. No. 12/486,269, filed Jun. 17, 2009.
U.S. Appl. No. 12/486,253, filed Jun. 17, 2009.
Office Action from Chinese patent Application No. 2005800142124, dated Mar. 14, 2008.
Office Action from Chinese patent Application No. 200580006438.X, filed Mar. 2, 2005.
Examiner's Consultation from European patent Application No. 05724190.3, dated Jun. 30, 2008.
Office Action from Russian Patent Office in Russian Serial No. 2006145434.
The Official Communication in Application No. 2006/145434, filed May 5, 2005.
Office Action from European Application No. 05746241.8, dated Aug. 29, 2007.
"Wireless R&D Aims to Boos Traffic," by M. Moore, InTech with Industrial Computing, Feb. 2002, pp. 40-41.

"System Checks Farawy Machines' Health," by J. Strothman, InTech with Industrial Computing, Feb. 2002, pp. 42-43.
Notification of Transmittal of the International Search Report or the Declaration—PCT/US03/10403.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. Ii, iii, iv and 1-12, Dec. 2003.
International Search Report and Written Opinion of Application No. PCT/US2005/015848, filed May 5, 2005.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
Notification of Transmittal of the International Search Report and the Written Opinion—PCT/US2005/021757.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022,Rev AA, Jul. 2002, "Model 4600 Oil & Gas Panel Transmitter," 65 pages.
Transmitter Schematic, Sold Jul. 2002, 5 pages.
Notification of Transmittal of the International Search Report and the Written Opinion of the International Searching Authority for International Application No. PCT/US2005/007328 filed Mar. 7, 2005. Date of Mailing: Jan. 12, 2006.
4 Pages from Website http://content.honeywell.com/imc/eznews/eznews0403/news.htm, 2004.
Notification of Transmittal of the International Search Report and the Written Opinion of the International Searching Authority for International Application No. PCT/US2006/025206 filed Jun. 27, 2006.
"Mechatronic Drives in Mobile Hydraulics," Internet Article, Soncebox News. No. 4, Oct. 2004.
USA & Metric Thread Standards http://www.carrlane.com/Catalog/index.cfm/29425071F0B221118070C1C513906103E0B05543B0B012009083C3B285357474A2D020609090C0015312A36515F554A5B.
Provisional U.S. Appl. No. 61/012,262, filed Dec. 7, 2007.
Provisional U.S. Appl. No. 60/937,396, filed Jun. 26, 2007.
Provisional U.S. Appl. No. 60/937,397, filed Jun. 26, 2007.
Office Action from European Application No. 05853808.3, dated Nov. 6, 2007.
Examination Report of the European Patent Office in Application No. 05724190.3, dated Jun. 30, 2008.
First Office Action from Chinese Patent Application No. 2005800142124, dated Mar. 14, 2008.
Office Action from U.S. Patent Office in U.S. Appl. No. 11/028,486, dated Nov. 13, 2007.
Office Action from U.S. Patent Office in U.S. Appl. No. 11/028,486 dated May 9, 2008.

Notification of Transmittal of the International Search Report and Written Opinion, PCT/US2009/0036616, dated Jan. 13, 2010.
"Notification of Transmittal of the International Search Report and The Written Opinion of the International Searching Authority" for PCT/US2008/011451 filed Oct. 3, 2008; date mailed Mar. 30, 2009; 16 pages.
The International Search Report and Written Opinion in Appln. No. PCT/US2005/021757, filed Jun. 21, 2005.
The International Search Report and Written Opinion in Application No. PCT/US2006/035728, filed Sep. 13, 2006.
The International Search Report and Written Opinion in Application No. PCT/US2009/003636, dated Oct. 6, 2009.
The International Search Report and Written Opinion in Application No. PCT/US2009/003611, dated Nov. 4, 2009.
The International Search Report and Written Opinion in Application No. PCT/US2009/003621, dated Sep. 30, 2009.
Notification of Transmittal of International Search Reprot and the Written Opinion for international patent application No. PCT/US2010/047463, dated Dec. 1, 2010.
Notification of Transmittal of International Search Reprot and the Written Opinion for international patent application No. PCT/US2010/047444, dated Dec. 10, 2010.
"Communication pursuant to Rules 161(1) and 162 EPC" for Application No. / Patent No. 09767062.4-1244 PCT/US2009003619; date Jan. 27, 2011.
The 7th Office Action from Chinese Patent Application No. 200580014212.4 issued Jan. 18, 2011, 28 pages.
Communication pursuant to Rules 161(1) and 162 EPC from related European Patent App. No. 09767061.6-1239 PCT/US2009003616 dated Jan. 28, 2011, date stamped Feb. 4, 2011.
Official Communication from Application No. 05746241.8, dated May 26, 2010.
Decision on Refusal to Grant from Russian patent Applic. No. 2006145434 dated Feb. 18, 2011, 28 pages.
Notification of Transmittal of the International Search Report and the Written Opinion, in related application PCT/US2009/003619, dated Sep. 30, 2009.
XP 002400076.
Third Office Action for Chinese Application No. 200680015575.4, dated May 11, 2010.
Communication for European Application No. 06774208.0, dated Apr. 16, 2010.
Second Office Action for Chinese Application No. 200680015575.4, dated Sep. 25, 2009.
Official Action for Russian Application No. 2008103014.
First Office Action for Chinese Application No. 200680015575.4, dated 2008.
Communication for European Application No. 06774208.0, dated Feb. 29, 2008.
First Office Action for Japanese Application No. 20008-518521, dated Aug. 24, 2010.
Communication from corresponding EP application Serial No. 08837236.2, dated Nov. 3, 2010.
Office Action from related U.S. Appl. No. 10/878,235, dated Mar. 8, 2006.
Office Action from related U.S. Appl. No. 10/878,235, dated Sep. 13, 2006.
Office Action from related U.S. Appl. No. 10/878,235, dated Mar. 6, 2007.
Office Action from corresponding European Application No. EP 09767062.4, dated Jul. 13, 2011, 5 pgs.

* cited by examiner

RF ADAPTER FOR FIELD DEVICE WITH LOOP CURRENT BYPASS

CROSS-REFERENCE TO RELATED APPLICATION

The present application is based on and claims the benefit of U.S. provisional patent application Ser. No. 61/073,093, filed Jun. 17, 2008, the content of which is hereby incorporated by reference in its entirety. The present application also notes the following related patent applications: U.S. application Ser. No. 12/125,187, filed May 22, 2008; U.S. Ser. No. 60/997,760, filed Oct. 5, 2007; U.S. Ser. No. 11/842,356, filed Aug. 21, 2007; and U.S. Ser. No. 10/878,235, filed Jun. 28, 2004, now U.S. Pat. No. 7,262,693, the contents of which are hereby incorporated by reference in their entirety.

BACKGROUND OF THE INVENTION

The present invention relates to industrial process control or monitoring systems. More specifically, the present invention relates to field devices in such systems which are capable of Radio Frequency (RF) communication.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices currently known, or yet to be known, used in the measurement, control and monitoring of industrial processes.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two-wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices.

In some installations, wireless technologies have begun to be used to communicate with field devices. For example, completely wireless installations are used in which the field device uses a battery, solar cell, or other technique to obtain power without any sort of wired connection. However, the majority of field devices are hardwired to a process control room and do not use wireless communication techniques.

Industrial process plants often contain hundreds or even thousands of field devices. Many of these field devices contain sophisticated electronics and are able to provide more data than the traditional analog 4-20 mA measurements. For a number of reasons, cost among them, many plants do not take advantage of the extra data that may be provided by such field devices. This has created a need for a wireless adapter for such field devices that can attach to the field devices and transmit data back to a control system or other monitoring or diagnostic system or application via a wireless network.

In some configurations, an RF adapter can be connected in series with the process control loop. In such a configuration, a loop current of the process control loop flows through circuitry of the wireless adapter. Should the circuitry of the wireless adapter fail, an open circuit may cause the loop current to not have a current path and any field devices coupled to the two-wire process control loop will no longer be able to communicate using the process control loop.

SUMMARY OF THE INVENTION

A wireless adapter for use with a two-wire process control loop is configured to couple to a process field device in an industrial process control system. The wireless adapter is coupled to the two-wire process control loop and provides wireless communication to the process field device. The adapter includes first and second loop terminals configured to couple in series with the two-wire process control loop. Wireless communication circuitry is coupled to the first and second loop terminals and is adapted to provide wireless communication to the process field device. Loop current bypass circuitry is electrically connected between the first and second loop terminals and is configured to provide a loop current path therebetween in response to an open circuit in wireless communication circuitry.

DETAILED DESCRIPTION OF ILLUSTRATIVE EMBODIMENTS

The present invention provides a wireless adapter for use with a field device in an industrial process control or monitoring system. The wireless adapter couples to the field device and provides the field device with wireless communication abilities. The adapter also couples to a two-wire process control loop which is used to connect the remotely located field device to a local location such as a process control room or the like. The adapter includes loop current bypass circuitry configured to provide a current path for a loop current of the two-wire process control loop in response to an open circuit condition in a current path of the wireless communication circuitry. This allows the two-wire process control loop to continue to function in the event of a failure of the wireless communication in circuitry in the wireless adapter.

Figure 1:
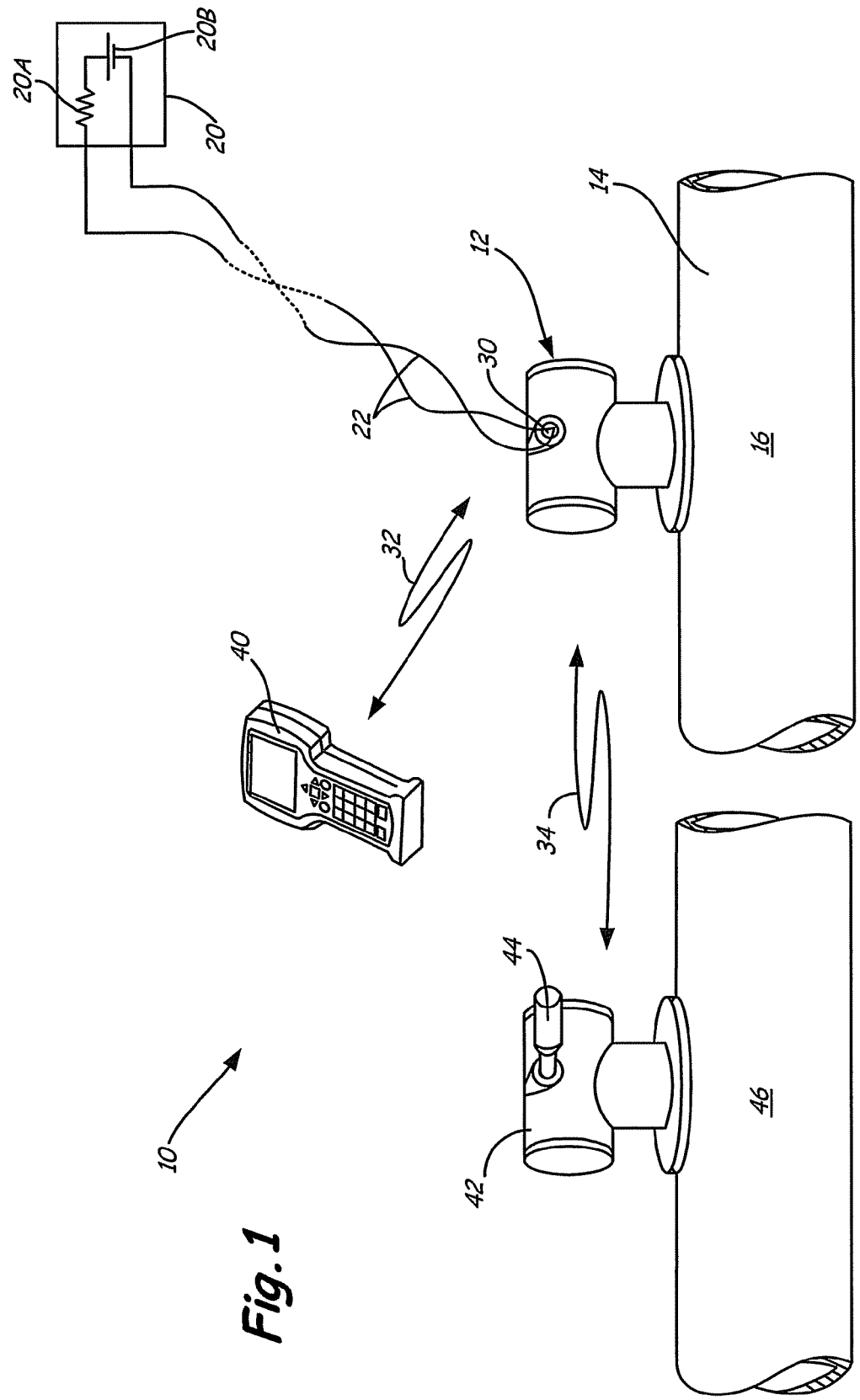
FIG. 1 is a simplified diagram showing an industrial process control or monitoring system which includes field devices having wireless adapters.

FIG. 1 is a simplified block diagram of a process control and monitoring system 10. In FIG. 1, field device 12 is shown coupled to process piping 14 which carries a process fluid 16. In this example, the field device 12 is illustrated as being a process variable transmitter. For example, a process variable transmitter may measure a process variable of process piping 14 such as pressure, flow rate, temperature, etc. Other types of field devices include control devices which are used to control operation of industrial process 10. However, the present invention is not limited to such a device. Field device 12 is typically located at a remote location, for example in a field of an industrial process plant and couples to a local location, such as a control room 20 through a two-wire process control loop 22. Control room 20 includes a load resistance 20A and a power source 20B. The two-wire process control loop 22 can operate in accordance with any appropriate standard or technique. A typical communications standard includes 4-20 mA process control loops in which a process variable is represented by a current level flowing through the process control loop. Another example includes digital communication techniques which may be modulated onto the analog current level of the two-wire loop, for example HART® communication standard. Other purely digital techniques are also employed including FieldBus based protocols. Typically, the field device 12 is powered using power received over the process control loop 22.

In FIG. 1, a wireless adapter 30 is shown coupled to the field device 12. Wireless adapter 30 can be used for wireless communications, illustrated by arrows 32 and 34 with other devices. For example, the adapter 30 can communicate with a handheld communicator 40 or another field device 42 which includes a wireless adapter 44. Field device 42 is shown coupled to process piping 46.

Figure 2:
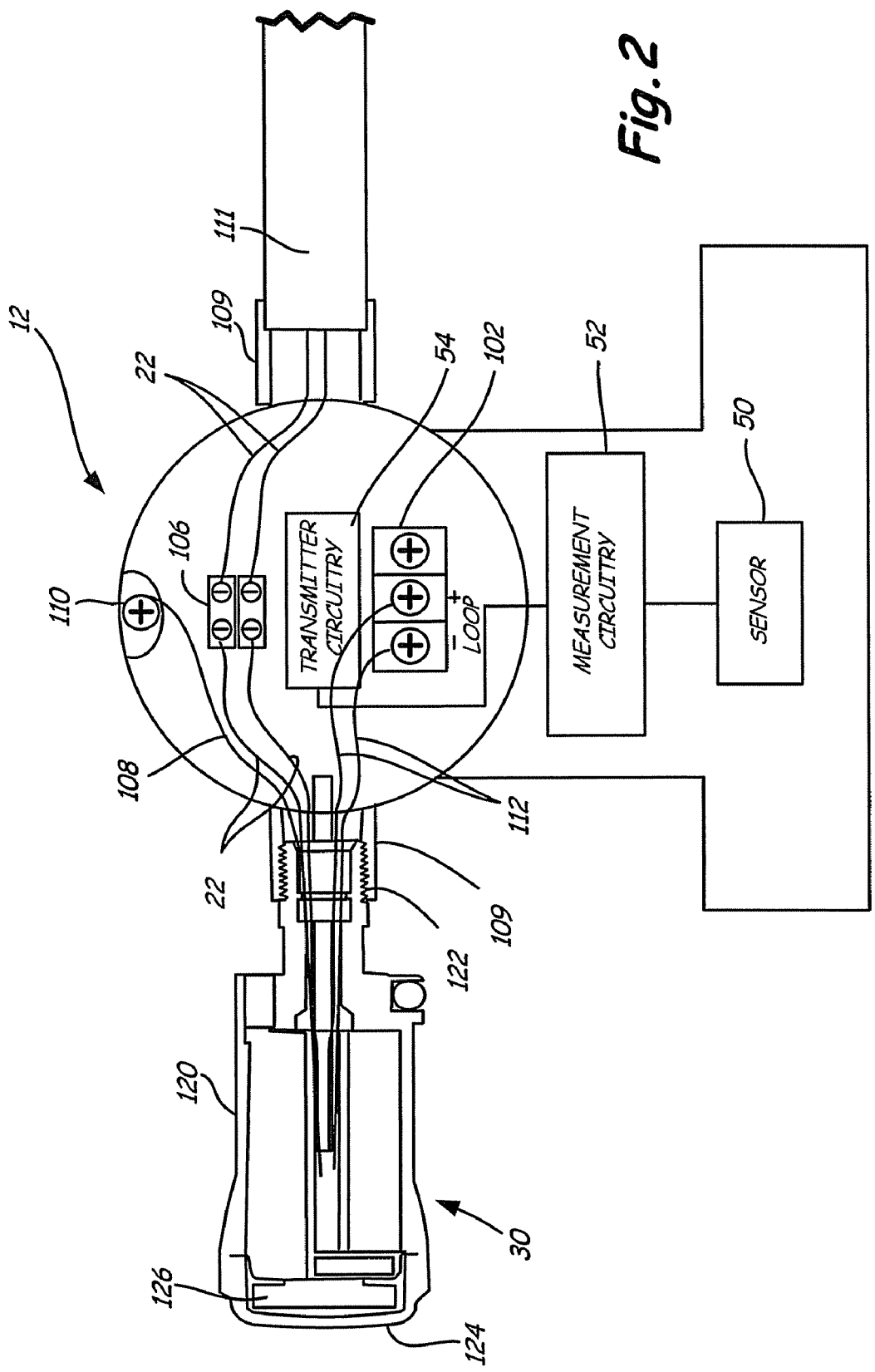
FIG. 2 is a cross-sectional view of a field device of FIG. 1 including a wireless adapter.

The wireless adapter 30 can communicate to other devices or components as desired and can be in communication with a remote monitoring or diagnostic system or application. The communication can be in accordance with any appropriate protocol. One example protocol such as wireless HART® includes the formation of a mesh network in which data is passed between wireless devices in order to expand and improve the reliability of the communication system FIG. 2 shows a simplified cross-sectional view of field device 12 and wireless adapter 30 coupled to two-wire process control loop 22. In the example of a process variable transmitter, field device 12 includes a process variable sensor 50 which is connected to measurement circuitry 52 configured to measure a process variable. Transmitter circuitry 54 is configured to receive the process variable and communicate the process variable onto the two-wire process control loop 22 using known techniques. The transmitter 12 couples to the two-wire process control loop through connection block 106. The wireless adapter 30 also couples to connection block 106 and is mounted to the housing of transmitter 12, for example, through threaded connections 122 and 109. For example, the coupling is through an NPT conduit coupling 109. A similar conduit connection 109 is also used to couple to conduit 111 which carries the two-wire process control loop 22 therethrough. The chassis of the wireless adapter 30 couples to an electrical ground connector 110 of transmitter 12 through wire 108. The transmitter 12 includes a two-wire process control connection block 102 which couples to connection 112 from the wireless adapter 30. A housing 120 of the wireless adapter 30 carries an antenna 126 which couples to circuitry of the wireless adapter 30. An RF transparent end cap 124 can be sealably coupled to the housing 120 to allow transmission of RF signals therethrough. In the arrangements shown in FIG. 2, five electrical connections are provided to the RF adapter which include four loop connections along with an electrical ground connection.

Figure 3A:
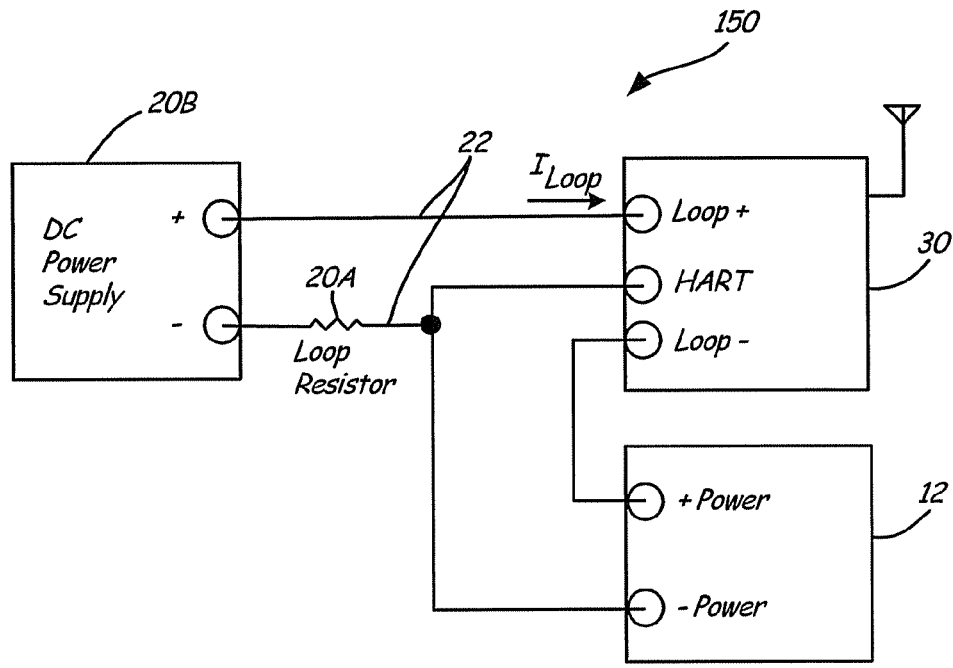
FIGS. 3A and 3B are wiring diagrams showing a field device and wireless adapter coupled to a two-wire process control loop.

FIG. 3A shows a simplified block diagram 150 which illustrates the electrical connections between the control room 20, the field device 12 and the wireless adapter 30. As illustrated in FIG. 3A, the wireless adapter 30 is coupled in series with the process control loop 22 through the Loop+ (also identified herein as L+) and Loop− (also identified herein as L−) connections and the field device 12 is also coupled in series with its plus power and minus power connections. HART® communication connection is used by the adapter 30 to communicate on the process control loop 22.

Figure 3B:
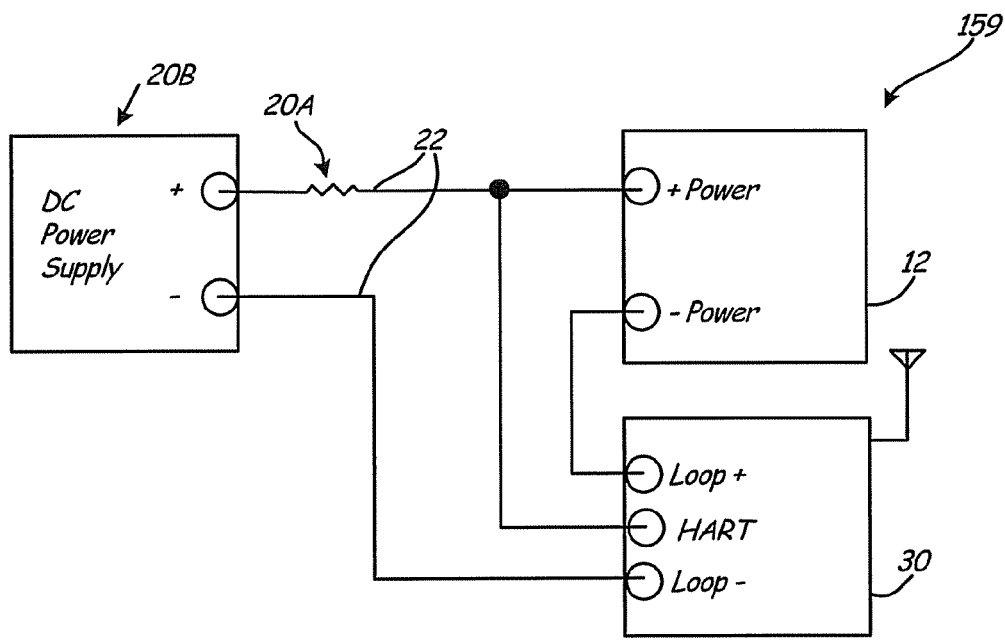

During operation, the adapter 30 operates using current from the 4-20 mA current flowing through the process control loop 22. In FIGS. 3A and 3B, the load resistor 20A is illustrated. Load resistor 20A is used by the process control system to sense the current $I_{Loop}$ flowing through the process control loop 22. For example, a process control system can convert a measured voltage across the load resistance to a value which is indicative of the process variable being sensed by a process variable transmitter. This variable may be related, for example, to process pressure, temperature, level, flow, or some other measured parameter. Typically, the load resistance has a value of 250 ohms. When the process control loop is carrying 4 mA, the voltage across this resistor is 1.0 volts. Similarly, when the process control loop is operating in 20 mA, the voltage drop across the resistor is 5 volts.

As illustrated in FIGS. 3A and 3B, the loop current ($I_L$ or $I_{Loop}$) flows through the wireless adapter 30 which is electrically coupled in series with the process device 12. If the wireless adapter 30 should fail in a manner which causes an open circuit to occur in the process control loop 22, the field device 12 will lose power and will not be able to communicate with the control room 20.

Figure 4:
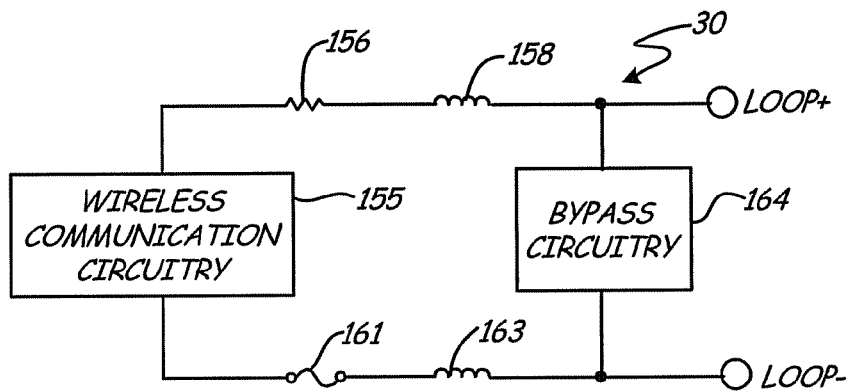
FIG. 4 shows an example configuration of a wireless adapter including loop current bypass circuitry.

FIG. 4 is a simplified block diagram showing the wireless adapter 30 including a redundant loop current path 164 which is also referred to herein as loop current bypass circuitry. Wireless adapter 30 includes wireless communication circuitry 155 which is configured for use in transmitting wireless communication signals based upon data communicated with the field device as discussed above. Wireless communication circuitry 155 is coupled in series with the Loop+ and Loop− terminals through resistor 156, an inductor 158, fuse 161 and inductor 163. Loop current bypass circuitry 164 is coupled in parallel with the Loop+ and Loop− terminals. The various components are shown as examples only. However, if any one of the series components (inductors 158 and 163, resistor 156, fuse 161, or the Wireless Communications Circuitry) should fail during operation of the wireless adapter and cause an open circuit there will be no current through the wireless adapter. With this open circuitry condition, the loop current $I_L$ would normally not be able to flow through the field device 12 and therefore the field device 12 would lose power and not be able to communicate with the control room. However, with this configuration, the loop current $I_L$ will flow through the bypass circuitry 164. With this configuration, the field device 12 will be able to continue operation and function normally even though the wireless communication adapter 30 is no longer operating. Although other components may be used in the circuitry shown in FIG. 4, inductors 158 and 163 may be present in the adapter 30 to protect the electronics from noise, electrostatic discharge and transients that may occur on the two-wire process control loop. The resistance 156 may be present to allow the circuitry to sense the loop current $I_L$ or to enable the electronics to operate in an intrinsically safe manner. The fuse 161 can be provided in order to enable the electronics to be intrinsically safe and disconnect the electronics if there is a short circuit.

Figure 5A:
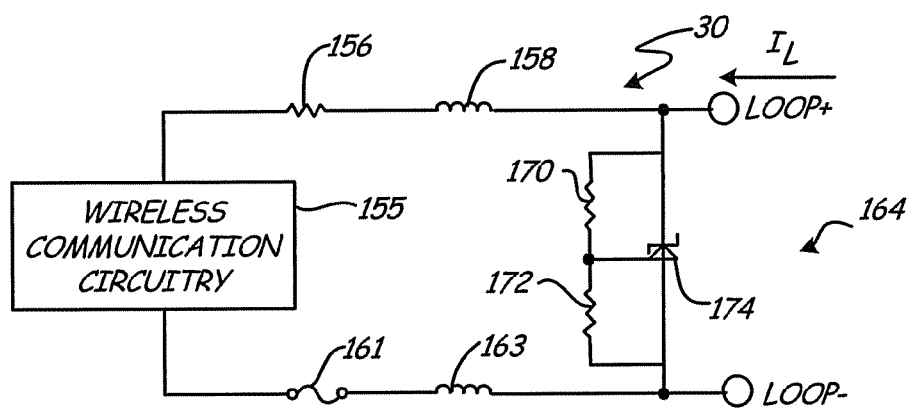
FIG. 5A is a simplified diagram showing an example of the loop current bypass circuitry of FIG. 4.

FIG. 5A is a simplified block diagram of adapter 30 showing one example configuration of loop current bypass circuitry 164. In FIG. 5A, loop current bypass circuitry 164 is illustrated as resistors 170 and 172 arranged in parallel with a precision shunt regulator 174. The shunt regulator 174 can comprise, for example, a TLVH431 regulator available from Texas Instruments. Resistors 170 and 172 can be configured to adjust the voltage at which the regulator 174 operates. Typically, this voltage will be selected to be slightly higher (0.25 volts, for instance) than the operating voltage of the wireless communication circuitry 155. Therefore, when the electronics of adapter 30 are operating normal, shunt 174 will not conduct any current. However, if one of the series components such as resistor 156, inductors 158, or 163, fuse 161, or some other component in wireless communication circuitry 155 is caused to fail and results in an open circuit, then shunt 174 will become conducting and carry the loop current $I_L$ therethrough. The voltage drop across the shunt 174 is established by the values of shunt 174 along with resistors 170 and 172.

Figure 5B:
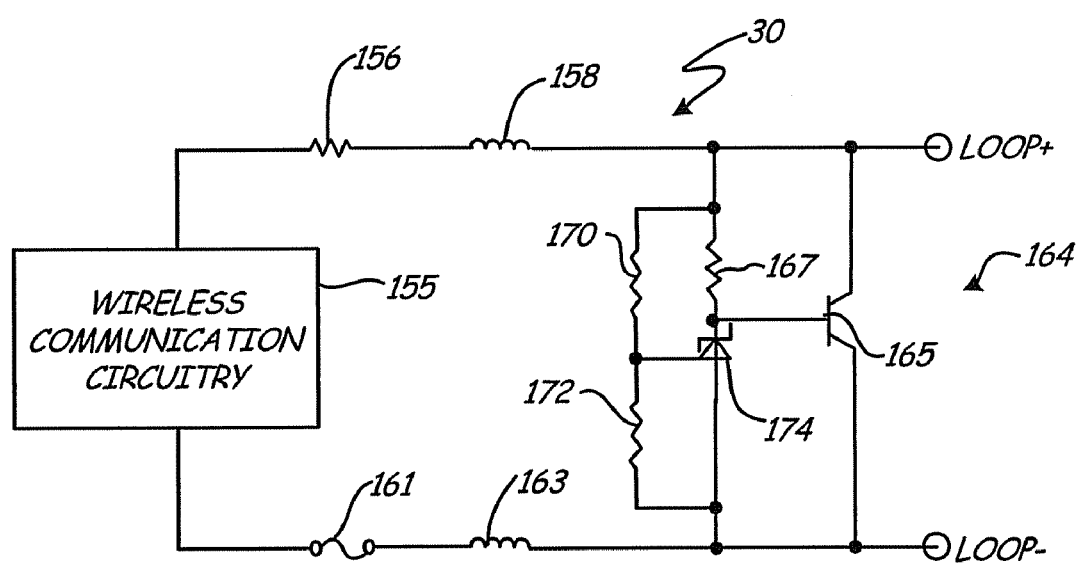
FIG. 5B shows another example configuration of loop current bypass circuitry for a wireless adapter.

In the configuration of FIG. 5A, it is possible for the shunt regulator 174 to fail in an open circuit condition. For example, if the loop current is exceptionally high for a temporary period, for example 500 mA, due to a failure or miswiring situation, the shunt regulator 174 may fail in an open condition. When the loop wiring is corrected, the bypass circuitry 164 will remain in the open condition. In order to prevent this from happening, additional circuitry shown in FIG. 5B can be used. In FIG. 5B, the bypass circuitry 164 includes a transistor 165. The transistor 165 can comprise, for example, a PNP transistor, a PNP Darlington transistor, or P-channel enhancement mode MOSFET. Thus, in a high current situation, when, for example fuse 161 is opened, regulator 174 begins conducting current. This will continue until the voltage across resistor 167 exceeds the $V_{be}$ of transistor 165 to thereby cause transistor 165 to conduct current. Once transistor 165 conducts current, it will pass all of the current, except for the bias current flowing through resistors 167, 170 and 172 and shunt regulator 174. Thus, the bypass circuitry 164 will be able to pass the amount of current for which transistor 165 is rated. Transistor 165 may be rated at, for example, 0.5 amps or higher. On the other hand, shunt regulator 174 may be rated at only about 80 mA. Note that in this configuration the voltage across the Loop+ and Loop− terminals is still determined by the values of resistors 170 and 172 and the reference voltage of regulator 174.

Figure 6:
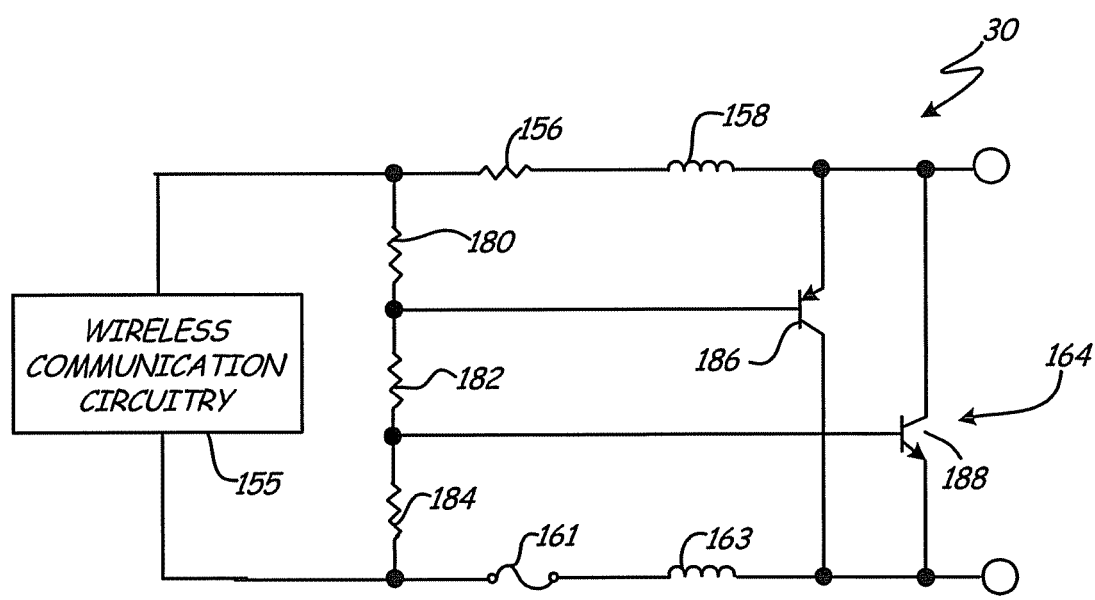
FIG. 6 shows an alternative configuration of loop current bypass circuitry in accordance with the present invention.

FIG. 5B is a simplified schematic diagram of adapter 30 showing another example configuration of the loop current bypass circuitry 164. In the configuration of FIG. 6, the loop current bypass circuitry 164 includes series resistors 180, 182 and 184 along with transistors 186 and 188. In this configuration, resistors 180, 182 and 184 are configured to bias transistors 186 and 188 so that both transistors are off in normal operation of the wireless communication adapter 30. However, if resistor 156 or inductor 158 becomes an open circuit, then transistor 188 is biased off but transistor 186 is biased on as its base voltage is pulled low. In this configuration, transistor 186 will carry all of the loop current $I_L$ thereby enabling the field device 12 to continue normal operations. On the other hand, if fuse 161 or inductor 163 experiences an open circuit condition, transistor 186 will be biased off, however, transistor 188 will be biased on as its base voltage will be pulled high. Transistor 188 then passes all of the loop current $I_L$ enabling normal operation of field device 12. Typical values of resistors 182 and 184 may be about one kΩ and resistor 180 may be about 47 kΩ. Transistor 186 may be a high gain PNP transistor, a PNP Darlington transistor or a P channel enhancement mode MOSFET transistor. Transistor 188 may be a high gain NPN transistor, an NPN Darlington transistor, or an N channel enhanced MOSFET transistor. One advantage of the configuration shown in FIG. 5A is the voltage drop of the wireless communications adapter 30 may be lower for this circuitry in comparison to that shown in FIG. 5A.

Figure 7:
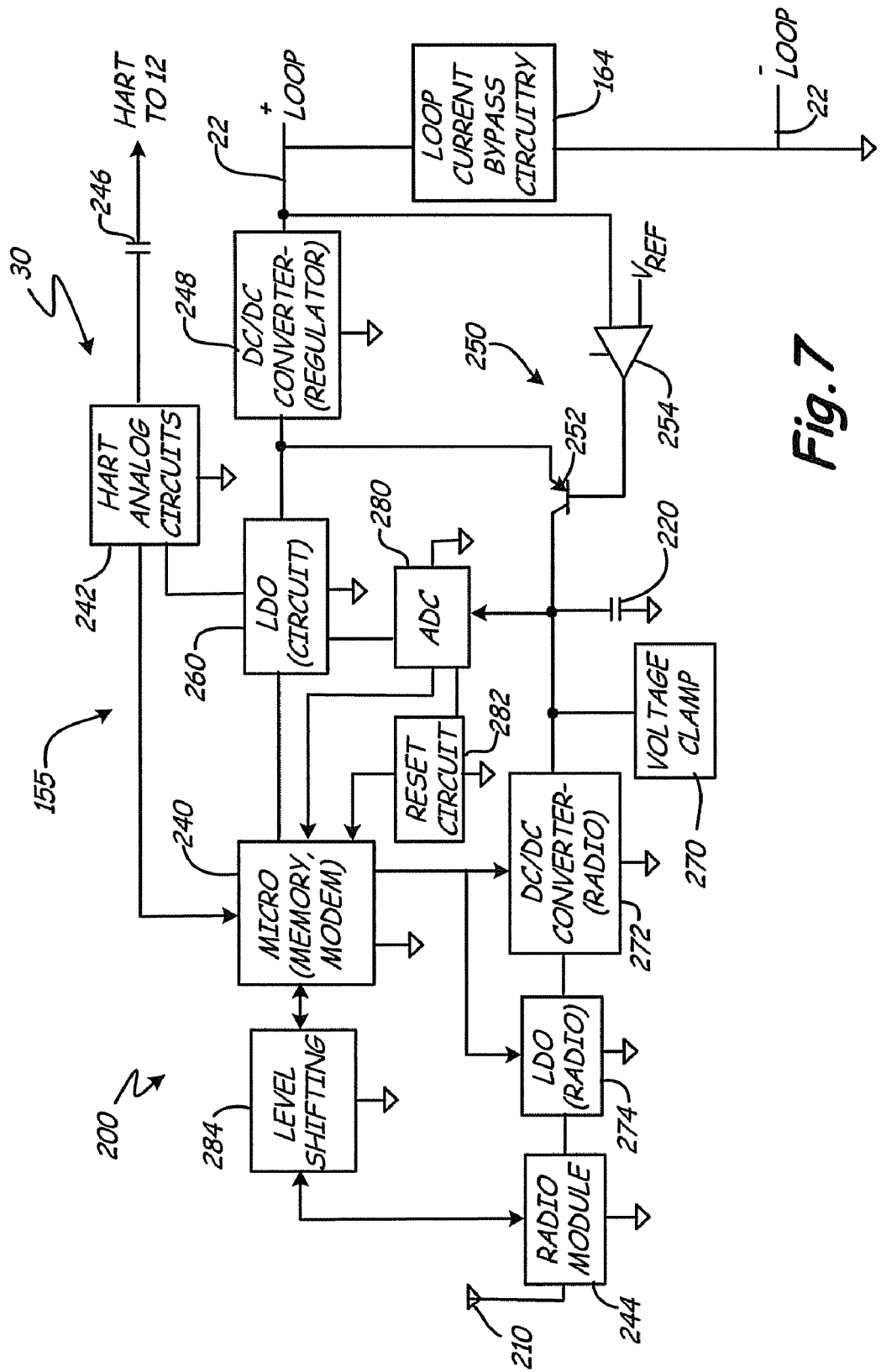
FIG. 7 is a simplified circuit diagram of a wireless adapter including a loop current bypass circuitry.

FIG. 7 is a more detailed block diagram of adapter 30 showing wireless communication circuitry 155. A capacitor 220 is illustrated and the adapter 30 is configured for HART® communication as well as wireless communication. As illustrated in FIG. 7, adapter 30 includes a microcontroller 240 which also includes a memory and a modem for communication. The memory is used to store programming instructions, configuration data, variables, etc. HART® analog circuitry 242 is configured to couple to the field device 12 through a DC blocking capacitor 246. A radio module 244 is provided to enable adapter 30 to communicate using RF communication techniques. A regulator 248 is provided which is configured as a DC to DC converter. A current shunt circuit 250 is connected in parallel with regulator 248 and includes a bypass transistor 252 controlled by a OP amp 254. OP amp 254 operates based upon a difference between a reference voltage ($V_{ref}$) and the voltage applied to the regulator 248. Regulator 248 provides a 2.3 volt output to a low dropout (LDO) regulator 260. Low dropout (LDO) regulator 260 provides a regulated 2 volt power supply output to the microprocessor 240, HART analog circuits 242, reset circuit 282 and ADC 280.

The current through bypass transistor 252 is used to charge the capacitor 220. The voltage across the capacitor 220 is set using a voltage clamp 270. For example, the voltage clamp can be set to 2.2 volts. Another DC to DC converter 272 is configured as a step up converter and provides a regulated voltage output of 3 volts to a low dropout (LDO) regulator 274. The output of low dropout (LDO) regulator 274 is set to 2.8 volts and used to provide regulated power to radio module 244.

The microprocessor 240 is connected to a analog to digital converter 280 which is used to monitor the voltage of capacitor 220. Microprocessor 240 is also connected to a reset circuit 282. Microprocessor 240 provides data to the radio module 244 through a level shifting circuit 284.

It is preferable that the circuitry is able to support the maximum amount of wireless communication activity while dropping a minimum amount of voltage in the loop 22. Therefore, the adapter 30 is preferably configured to use power from the loop 22 in a very efficient manner. In one specific configuration, this can be achieved by using a low power microcontroller 240, for example, Atmel ATmega1281 and by using low power analog circuit components. These components can be powered by a low supply voltage to also minimize the total circuit power consumption. Further, the microcontroller 240 can be configured to enter a "sleep"

mode if desired when certain functions are not needed, for example communication functions. A separate modem can also be utilized if desired.

It is also preferable to provide the radio module 244 with a large amount of power. This allows more frequent communication and increased reliability. The additional power can be used to publish information from the transmitter 12, allow the adapter 30 to be used as a router for other process transmitters, for example in a mesh network and allow higher transmit power to be used. This can result in a more reliable mesh network, as the path from another wireless device through the adapter 30 to a host may be more reliable than the path which is directly from the device to the host.

In the embodiment of FIG. 7, the radio module 244 is powered by capacitor 220. Therefore, in order to increase the power which is provided to the radio module 244, it is preferable to increase the power stored by capacitor 220. In the configuration of FIG. 7, this is achieved by arranging the capacitor 220 as a shunt element for the regulator 248 which regulates the voltage drop across the terminals which couple to loop 22 in conjunction with OPamp 254 and shunt transistor 252. In FIG. 7, the voltage across the loop terminals which couple to the process control loop 22 is regulated to one volt. This is achieved by adjusting the current going to the capacitor using OPamp 254 and shunt transistor 252. In this configuration, regulator 248 operates in series with the loop 22 and is in the feedback loop formed by OPamp 254. In a less efficient configuration, a separate one volt shunt regulator and capacitor charging circuit may be implemented. However, this requires additional components and additional power to operate. In contrast, in the configuration set forth in FIG. 7, any loop current which is not used by the circuitry of adapter 30 is directed into shunt capacitor 220 for increased efficiency. This results in the maximum amount of power being available for radio module 244. The voltage clamp 270 determines the voltage to which capacitor 220 is charged. Once the capacitor 220 reaches the voltage set by the voltage clamp 270, the excess current flows through clamp 270 rather than into capacitor 220.

DC to DC converter 248 is configured as a low power "step up" switching regulator that operates with an input voltage of 1 volt. Regulator 248 increases the 1 volt input voltage to a sufficiently high voltage to power the remaining circuitry. In the example of FIG. 7, this is 2.3 volts. The converter can be a switched capacitor type converter, an inductor based boost converter, a transformer based converter or other appropriate configuration. The LDO regulator 260 regulates the 2.3 volt output from regulator 248 to 2.0 volts and removes any switching noise from the regulator 248. The output from the LDO regulator 260 is used to power the microprocessor 240, HART® analog circuits 242, memory, reset circuitry 282, and analog to digital converter 280.

HART® analog circuit block 242 can comprise, for example, a carrier detect circuit, a receive circuit and a transmit circuit. Preferably, these circuits are configured to have low power requirements while maintaining acceptable communications integrity. The memory in microprocessor 240 can be used to store programming code and temporary variables. Timers which are internal to microprocessor 240 can optionally be used to provide a "software" modem functionality. The memory of the microprocessor 240 may include internal flash memory, RAM as well as EEPROM or other non volatile memory. The microcontroller 240 can be configured to monitor the voltage access capacitor 220 using analog to digital converter 280 which provides a digital output to microcontroller 240 representative of the capacitive voltage. If desired, the microcontroller 240 can be used to determine whether the capacitor has a sufficient voltage to support radio transmission. Reset circuit 282 can be used to ensure that microcontroller 240 does not operate when the voltage is insufficient. For example, the reset circuit 282 can be configured to reset, or turn on, the microcontroller 240 when the supply voltage from LDO regulator 260 reaches a sufficient voltage level. The circuitry can also be used to reset the microcontroller 240 if a power "glitch" occurs.

Radio module 244 operates on a stable voltage of 2.8 volts provided by LDO regulator 274. As discussed above, if the capacitor 220 is charged to 2.2 volts, the DC to DC converter regulator 272 steps up the voltage to 3 volts. During use, the voltage on the capacitor will decrease and the step up converter is needed. The LDO regulator 274 is used to provide a stable 2.8 volts to the radio module 244. Preferably, regulator 272 is configured to operate off a minimum voltage of about 1 volt up to a maximum voltage of about 2.2 volts. In some configurations, microcontroller 240 is configured to turn off circuitry of radio module 244 if the voltage on the capacitor 220 is less than 1 volt.

Microcontroller 240 can be configured to transmit information wirelessly using the radio module 244 by communicating over digital communication lines between the radio module 244 and the microcontroller 240. As the microcontroller operates from a two volt power supply while the radio operates from a 2.8 power supply, the digital communication lines between the two components must be level shifted using level shifting circuitry 284. For example, this can be performed using very low power level translator circuits such as Texas Instruments SN74LVC2T45DCU.

In one configuration, the voltage drop across the loop terminals which couple to loop 22 can be adjusted by adjusting $V_{REF}$ coupled to the inverting input of OPamp 254 of the shunt circuitry 250. In such a configuration, additional power may be made available to the radio by increasing the loop voltage drop under appropriate conditions. Similarly, if the impact on the process control loop of the circuitry of adapter 30 needs to be reduced, the voltage drop can be decreased. However, this will provide less power to the radio module and other circuitry of adapter 30 and may degrade performance.

Also shown in FIG. 7 is the arrangement of loop current bypass circuitry 164 which is coupled between the Loop+ and the Loop− connections to process control loop 22. Loop current bypass circuitry 164 operates in the manner discussed above. Note that FIG. 7 does not explicitly show resistor 156, inductors 158,163 and fuse 161 illustrated in previous figures. However, these components are located as individual items and not shown in FIG. 7, or are contained in the various circuit blocks shown in FIG. 7.

Figure 8:
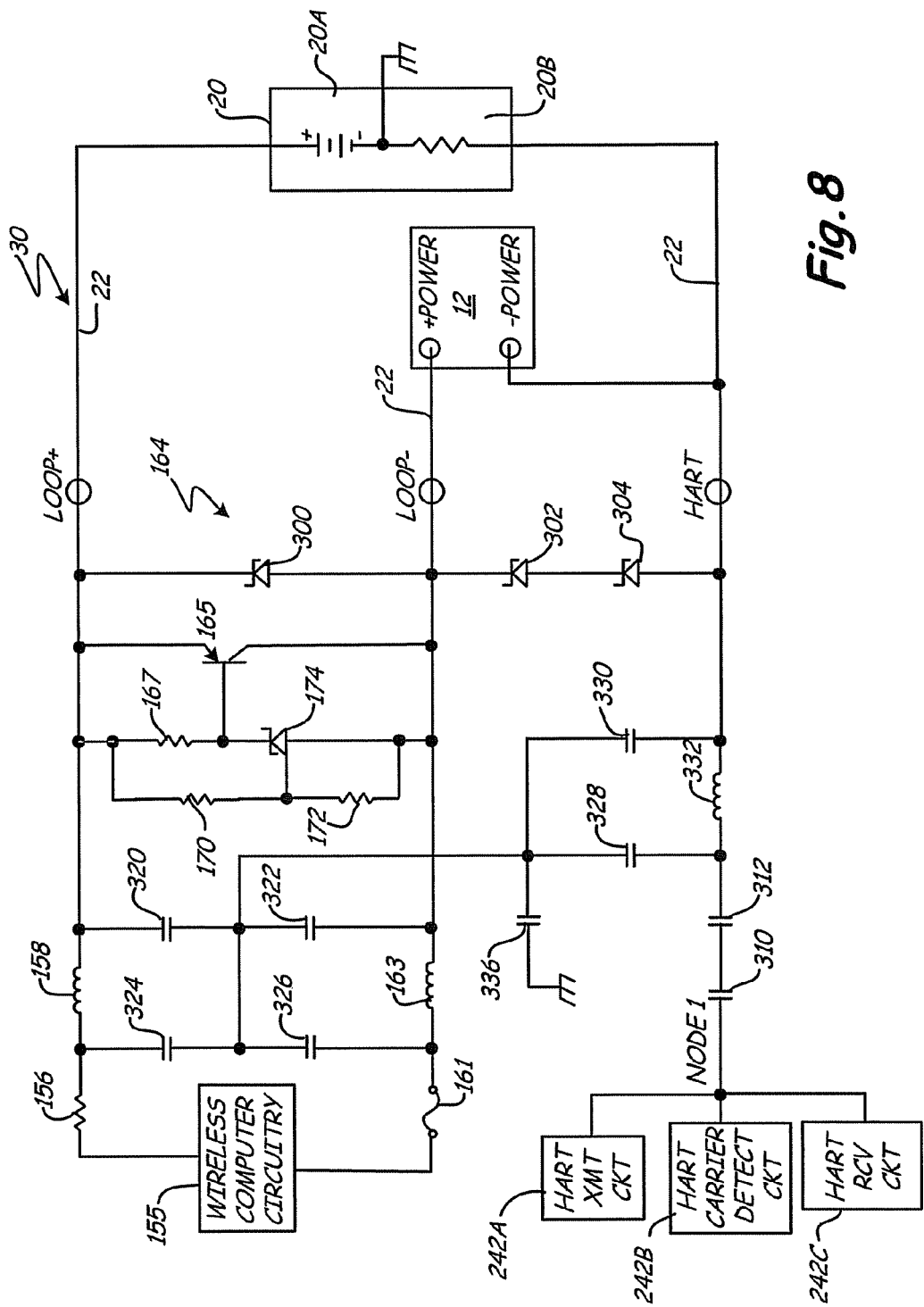
FIG. 8 is a simplified schematic diagram showing a more details regarding the connection of the wireless adapter to the two wire process control loop in a field device.

FIG. 8 is a more detailed schematic diagram showing the connections between the wireless adapter and the process control loop 22. As illustrated in FIG. 7, the HART terminal and the Loop− terminal of the adapter 30 are coupled to the +Power and −Power terminals of the field device 12. Therefore, there is a possibility that a component failure in the adapter 30 may cause a short circuit of the supply voltage provided to the field device 12. If this occurs, communication of the process variable being measured by the field device will be interrupted and the field device 12 will not be able to communicate to the process control room 20. The circuitry shown in FIG. 8 addresses these concerns.

In FIG. 8, diodes 300, 302 and 304 are provided for transient protection. They are configured to protect the adapter 30 from high voltage transients that may be induced in the process control loop 22. These diodes limit the voltage transients to low voltage levels that can be tolerated by the adapter electronics. Diodes 302 and 304 are electrically connected directly across the power terminals of the field device. Note that if only a single transient protection diode was employed, and that diode failed in a short circuit condition, it would short the power provided to the field device 12. In the configured shown in FIG. 8, a redundant diode is provided to help prevent such a failure.

In FIG. 8, the HART analog electronics 242 shown in FIG. 7 are illustrated as three separate components, HART transmit circuitry 242A, HART carrier detect circuitry 242B and HART receive circuitry 242C. These circuits operate at a very low DC voltage relative to the Loop− terminal. If the node shown in FIG. 8 identified as NODE 1 is shorted to the HART terminal due to a component failure, the field device 12 would receive a very low DC voltage across it and would probably not be able to operate correctly. Therefore, redundant capacitors 310 and 312 are provided to connect the HART communications circuits 242A,B,C to the HART terminal. If one of these capacitors fails in a shorted condition, the voltage provided to the field device 12 will not be effected and the HART communications circuitry in the adapter 30 will also continue to function correctly. Capacitors 320, 322, 324, 326, 328 and 330 along with inductors 158, 163 and 332 are used to provide RFI protection to electronics of the adapter 30. All of these capacitors should have an AC connection to earth ground through the chassis of the adapter 30 in order to create a current path to earth ground for the radio frequency interference. However, in some instances, the process control loop is also connected to earth ground for safety reasons. It is common for a 4-20 mA current loop to be earth grounded at the minus terminal of the power supply 20A. A redundant capacitor to connect the RFI protection capacitors to the chassis of the adapter 30 is also illustrated in FIG. 8 at element 336. Capacitor 336 reduces the possibility of shorting out the power to the field device 12 in the event of a failure of one of the RFI protection capacitors. Note that if capacitor 320 is connected directly to the chassis of the adapter 30 and therefore connected to earth ground, and the capacitor failed in a shorted condition, current would flow from the power source 20A to the Loop+ terminal of the adapter 30 through the shorted capacitor 320 and to earth ground and then return to the power supply minus connection of power supply 20A. Thus, there would be no current flow through the adapter electronics or the field device 12 for this component failure. However, with the capacitor 336 in place, the flow of DC current through the adapter 30 and the field device 12 will not be affected by a short of capacitor 320. A short of capacitor 324 would cause a similar type of failure. A short in capacitors 322 or 326 will result in the flow of current through the adapter, but the current would return to the minus connection of the power supply 20A and bypass the field device if capacitor 336 was not present. Similarly, without capacitor 336 in place, and if the plus terminal of power source 20A is earth grounded, should capacitors 328 or 330 fail in a shorted condition, current would flow from the plus output of the power supply 20A through the shorted capacitor 328 or 330 and back to resistor 20B through the HART terminal. Thus, no current would flow through the adapter electronics 30 or the field device 12 if capacitors 328 and 330 were shorted without the addition of the redundant capacitor 336.

Thus, in the configuration of FIG. 8, the wireless adapter 30 has been designed such that no single component failure can cause a failure of the current flow to the field device. A redundant bypass circuit protects the device against the failure of any series component in the electronics of adapter 30. Several redundant components are also employed to protect against current flowing around the field device.

The term "field device" as used herein can be any device which is used in a process controller monitoring system and does not necessarily require placement in the "field." The device can be located anywhere in the process control system including in a control room or control circuitry. The terminals used to connect to the process control loop refer to any electrical connection and may not comprise physical or discrete terminals. Any appropriate radio frequency communication circuitry can be used as desired as can any appropriate communication protocol, frequency or communication technique. The power supply circuitry is configured as desired and is not limited to the configurations set forth herein. In some embodiments, the field device includes an address which can be included in any RF transmissions such that the device can be identified. Similarly, such an address can be used to determine if a received signal is intended for that particular device. However, in other embodiments, no address is utilized and data is simply transmitted from the wireless communication circuitry without any addressing information. In such a configuration, if receipt of data is desired, any received data may not include addressing information. In some embodiments, this may be acceptable. In others, other addressing techniques or identification techniques can be used such as assigning a particular frequency or communication protocol to a particular device, assigning a particular time slot or period to a particular device or other techniques. Any appropriate communication protocol and/or networking technique can be employed including token-based techniques in which a token is handed off between devices to thereby allow transmission or reception for the particular device.

Although the present invention has been described with reference to preferred embodiments, workers skilled in the art will recognize that changes may be made in form and detail without departing from the spirit and scope of the invention. As used herein, Radio Frequency (RF) can comprise electromagnetic transmissions of any frequency and is not limited to a particular group of frequencies, range of frequencies or any other limitation. Any communication protocol can be used, as desired, including IEEE 802.11b, 802.15.4, or other protocols, including proprietary communication protocols. In the discussion above, the wireless adapter provides a digital signal communication connection for coupling to the two wire process control loop and, in some embodiments, communicating in accordance with the HART® communication protocol. The adapter can be configured to mount externally to a process control transmitter, for example, through a threaded coupling to NPT fittings in the transmitter housing.

Although the present invention has been described with reference to preferred embodiments, workers skilled in the art will recognize that changes may be made in form and detail without departing from the spirit and scope of the invention.

What is claimed is:

1. A wireless adapter for use in a two-wire process control loop configured to couple to a process field device in an industrial process control system which is coupled to the two-wire process control loop and provide wireless communication to the process field device, comprising:
    first and second loop terminals configured to couple in series with the two-wire process control loop;
    wireless communication circuitry coupled to the first and second loop terminals adapted to provide wireless communication to the process field device; and
    loop current bypass circuitry electrically connected between the first and second loop terminals configured to provide a loop current path therebetween in response to an open circuit in a current path of the wireless communication circuitry between the first and second loop terminals.

2. The apparatus of claim 1 wherein the loop current bypass circuitry includes a precision shunt regulator.

3. The apparatus of claim 2 wherein the precision shunt regulator is configured to conduct electricity, conduct the loop current in response to the open circuit.

4. The apparatus of claim 1 wherein the loop current bypass circuitry includes a transistor.

5. The apparatus of claim 4 wherein the transistor is configured to conduct the loop current in response to the open circuit.

6. The apparatus of claim 4 including a second transistor.

7. The apparatus of claim 4 having a base biased whereby the transistor is not conducting when electrical current is flowing through the wireless communication circuitry and biased to be conducting when electrical current is blocked from the wireless communication circuitry.

8. The apparatus of claim 4 wherein the transistor comprises a PNP transistor.

9. The apparatus of claim 4 wherein the transistor comprises a Darlington transistor.

10. The apparatus of claim 4 wherein the transistor comprises a MOSFET.

11. The apparatus of claim 4 wherein the transistor comprises an NPN transistor.

12. The apparatus of claim 1 including a third connection configured to electrically couple to the field device.

13. The apparatus of claim 12 including communication circuitry configured to communicate to the field device through the third connection.

14. The apparatus of claim 1 including redundant components to provide power to the field device in the event of a failure of circuitry in the adapter.

15. The apparatus of claim 1 wherein the two-wire process control loop comprises a 4-20 mA current loop.

16. The apparatus of claim 1 wherein the two-wire process control loop carries digital communication in accordance with the HART® communication protocol.

17. A method of providing wireless communication to a process field device coupled to a two-wire process control loop using a wireless adapter, comprising:
coupling first and second loop terminals of the wireless adapter to the two-wire process control loop;
providing power to wireless communication circuitry from the two-wire process control loop through the first and second loop terminals;
providing wireless communication to the process field device using wireless communication circuitry powered with power received from the two-wire process control loops;
electrically bypassing the wireless communication circuitry by providing a current path between the first and second loop terminals in response to an open circuit in a current path through the wireless communication circuitry.

18. The method of claim 17 wherein electrically bypassing includes activating a precision shunt regulator.

19. The method of claim 17 wherein electrically bypassing includes activating a transistor.

20. The method of claim 17 including communicating with the field device through the third connection.

21. The method of claim 17 wherein the two-wire process control loop carries digital communication in accordance with the HART® communication protocol.

22. The method of claim 17 wherein one of the first and second loop terminals directly couples to the process field device and further including coupling a communication terminal to the process field device for use in communicating with the process field device.

* * * * *